(12) United States Patent
Leickel et al.

(10) Patent No.: US 6,696,919 B1
(45) Date of Patent: Feb. 24, 2004

(54) METHOD OF STARTING A DEVICE PROTECTED AGAINST UNAUTHORIZED USE BY A PIN WITHOUT USING AN INPUT

(75) Inventors: Torsten Leickel, Herne (DE); Frank Scheiba, Dülmen (DE)

(73) Assignee: Nokia Mobile Phones Ltd., Espoo (FI)

( * ) Notice: Subject to any disclaimer, the term of this patent is extended or adjusted under 35 U.S.C. 154(b) by 340 days.

(21) Appl. No.: 09/617,377

(22) Filed: Jul. 17, 2000

(30) Foreign Application Priority Data

Jul. 21, 1999 (DE) .......................... 199 34 098

(51) Int. Cl.[7] .............................. G05B 19/00
(52) U.S. Cl. .................. 340/5.74; 340/5.81; 713/168; 380/247
(58) Field of Search .............. 340/5.74, 5.81, 340/5.85; 713/168, 170, 172, 176, 179, 181, 183; 380/247

(56) References Cited

U.S. PATENT DOCUMENTS 4,965,568 A * 10/1990 Atalla et al. ........... 340/825.34
5,196,840 A * 3/1993 Leith et al. .............. 340/825.3
6,460,138 B1 * 10/2002 Morris ..................... 713/184

FOREIGN PATENT DOCUMENTS

| DE | 19523009 | 1/1997 |
| DE | 19622720 | 12/1997 |
| DE | 19622721 | 12/1997 |
| DE | 18633802 | 2/1998 |
| DE | 19722181 | 11/1998 |

* cited by examiner

Primary Examiner—Michael Horabik
Assistant Examiner—M Shimizu
(74) Attorney, Agent, or Firm—Ware, Fressola Van Der Sluys & Adolphson LLP (57) ABSTRACT

When a PIN need to use a protected device is manually entered for the time, it is encoded by means of unique identity number and stored in a PIN memory, the number is also used for the array in which or in connection with the device operates. If the user later identifies himself with an identity number which authorizes a subsequent use of the array, the encoded PIN stored in the PIN memory is decoded by means of the identity number and is made available to the device. Special advantages result when the environment is a vehicle and the device is a mobile telephone, since the network log-in takes place at the same time the vehicle is started with an authorized key.

9 Claims, 4 Drawing Sheets

METHOD OF STARTING A DEVICE PROTECTED AGAINST UNAUTHORIZED USE BY A PIN WITHOUT USING AN INPUT

TECHNICAL AREA

The invention concerns a method of starting a device protected against unauthorized use by a PIN without using an input, particularly by improving the user friendliness of such devices while simultaneously increasing the protection against unauthorized use.

BACKGROUND OF THE INVENTION

To protect devices against unauthorized use and establish individualization, it is known in the state of the art to provide so-called PINs which must be manually entered by an authorized person into the device. For example with mobile telephones it is usual to ask for a four-digit PIN after the device is started, without the correct input of which no logging into the operator's network can take place. This ensures that turned-off mobile telephones become unattractive to thieves, because they cannot be used without first entering the PIN.

Even though this safety function is justified for mobile telephones which are not always carried by a user, it is sometimes considered bothersome to have to enter the PIN to individualize an authorized use. This applies especially when the mobile telephone is used in an environment which itself is protected against unauthorized use. If this environment is a vehicle, it means that the respective PIN must be entered every time the vehicle is used, unless the mobile telephone user gives up the theft protection and thus PIN request for logging into the network is omitted.

To avoid this problem, DE-A-19722181 indicates a method and an array which makes it superfluous to enter the PIN when an automobile with a PIN-protected mobile telephone is started. This is essentially accomplished in that the built-in mobile telephone fixture in the automobile has a memory which stores the PIN required to operate the mobile telephone. In addition a device for detecting a release signal and a device for transmitting-receiving a code signal is provided, which upon request transmits the stored PIN to the mobile telephone as a function of the release signal's detection. Since according to other configurations the release signal is always an ignition signal which upon receipt triggers a start-up signal in the mobile telephone, the release or ignition signal is nothing more than the on-board power supply which provides voltage to the mobile telephone and to the memory when the ignition is activated. Once the mobile telephone and the memory are connected to the on-board power supply by activating the ignition, an inquiry about a stored PIN is made to the memory. In the affirmative the PIN stored in the memory is transmitted to the mobile telephone so that the network log-in can then take place. If no PIN is found the user is requested to enter the PIN manually. To prevent the stored PIN from being transmitted in "clear text" form to the mobile telephone, in another embodiment a request for the PIN produces a random data word in the mobile telephone and is sent to the memory. This data word then encodes the PIN and is made available in this form to the mobile telephone; it is subsequently decoded. If the encoded PIN corresponds to a PIN that authorizes the use of the mobile telephone, a network log-in takes place.

Although the known array contributes to simplifying the network log-in, it only provides insufficient protection against theft or unauthorized use. This is so because the ignition signal, namely the on-board power supply, can very easily be triggered or simulated. Furthermore the known array cannot ensure that different users of the vehicle have different authorizations for using the mobile telephone, because as soon as a user operates a vehicle equipped with the known array, he always has telephone function, unless additional steps to deactivate the mobile telephone have been taken. If the deactivating steps have been taken, the mobile telephone is now completely useless, even though this situation only requires protection against calls made from the mobile telephone, but not against received calls.

It is therefore the objective of the invention to indicate a method for the input-free starting of a device that is protected by a PIN against unauthorized use, and when it operates in an environment which is also protected against unauthorized use, it has greater flexibility and user friendliness in addition to improved safety against unauthorized use.

SUMMARY OF THE INVENTION

This objective is achieved by a method of starting a device which is protected against unauthorized use by a PIN without using an input, where the device operates in an environment which in turn allows the use of an array by comparing a user code with a unique identity number stored in the array, characterized in that in a first step the PIN, which is needed to use the protected device, is encoded by means of the unique identity number and is then stored in a memory, and that with a "comparison" between the user code and the unique identity number which allows the use of the array, the encoded PIN is decoded by means of the unique identity number and is made available to the protected device to establish its operating status.

This objective is also achieved by a method of starting a device protected against unauthorized use by a PIN without using an input, where the device operates in an environment which in turn allows the use of an array by comparing a user code with a unique identity number stored in the array, characterized in that in a first step the PIN, which is needed to use the protected device, is encoded by means of at least a portion of the user code and is then stored in a memory, and that with a "comparison" between the user code and the unique identity number, which allows the use of the array, the encoded PIN is decoded by means of the user code and made available to the protected device to establish its operating status.

A unique identity number is used to encode or decode a PIN stored in or read out from a memory, and is also used for the array in which the device operates, the device is also protected with the same safety as the array itself. It does not matter where the memory containing the encoded PIN is located. If it is located in the device itself and the unique identity number is transmitted to the device, the PIN always remains hidden and cannot be decoded, or only with a disproportionately large effort. Less safety is provided if the memory belongs to the array, because when the array operates the PIN is transmitted to the device without encoding. But even if the transmission of the unencoded PIN is less than optimal from the safety point of view, this operating mode ensures that the unique identity number does not leave the array.

It should already be pointed out here that the user code which allows the use of the array in conjunction with the unique identity number, need not necessarily differ from the unique identity number. For example if the user code and the identity code are the same, the authorized use of the array can very easily be checked by simply comparing the user code with the identity code. However since this does not ensure either that the unique identity number remains in the array, for reasons of safety the user code should be arranged so that it is decoded in the array, and the result of the decoding is compared with the unique identity number as proof of an authorized use.

If instead of the unique identity number, a number which is derived from the unique identity number is used to encode or decode the PIN, and for example only the first three digits or a hash code of the unique identity number is used to encode or decode the PIN, the unique identity number is sufficiently protected, even if the memory containing the PIN is located in the device.

If the PIN is encoded or decoded by means of a true user code, i.e. one that differs from the unique identity number, and an authorized use of the array is determined by comparing the true user code with the unique identity number, whatever kind of disclosure of the unique identity number is prevented outside of the array.

If a number of different user codes is provided and all of them, after a comparison with the unique identity number, enable an authorized use which does not necessarily include all the functions of the array, and either the degree of conformation of the respective user code with the unique identity number or the respective user code itself decide about the decoding of the stored PIN and/or its usage, it creates a stepped access authorization to the device, which either does or does not allow use of the device as a function of the entered user code. In this connection it should also be pointed out that when several user codes exist, the PIN can only be encoded or decoded by means of one user code.

If the protected device is a telephone, particularly a mobile telephone, and the environment in which the telephone operates is a vehicle or a building, the telephone can be operated without entering the required PIN, although the PEN always protects the telephone.

DESCRIPTION OF THE DRAWINGS

Wherein.

BEST MODE FOR CARRYING OUT THE INVENTION

The invention will now be explained in greater detail by means of the figures.

Figure 1:
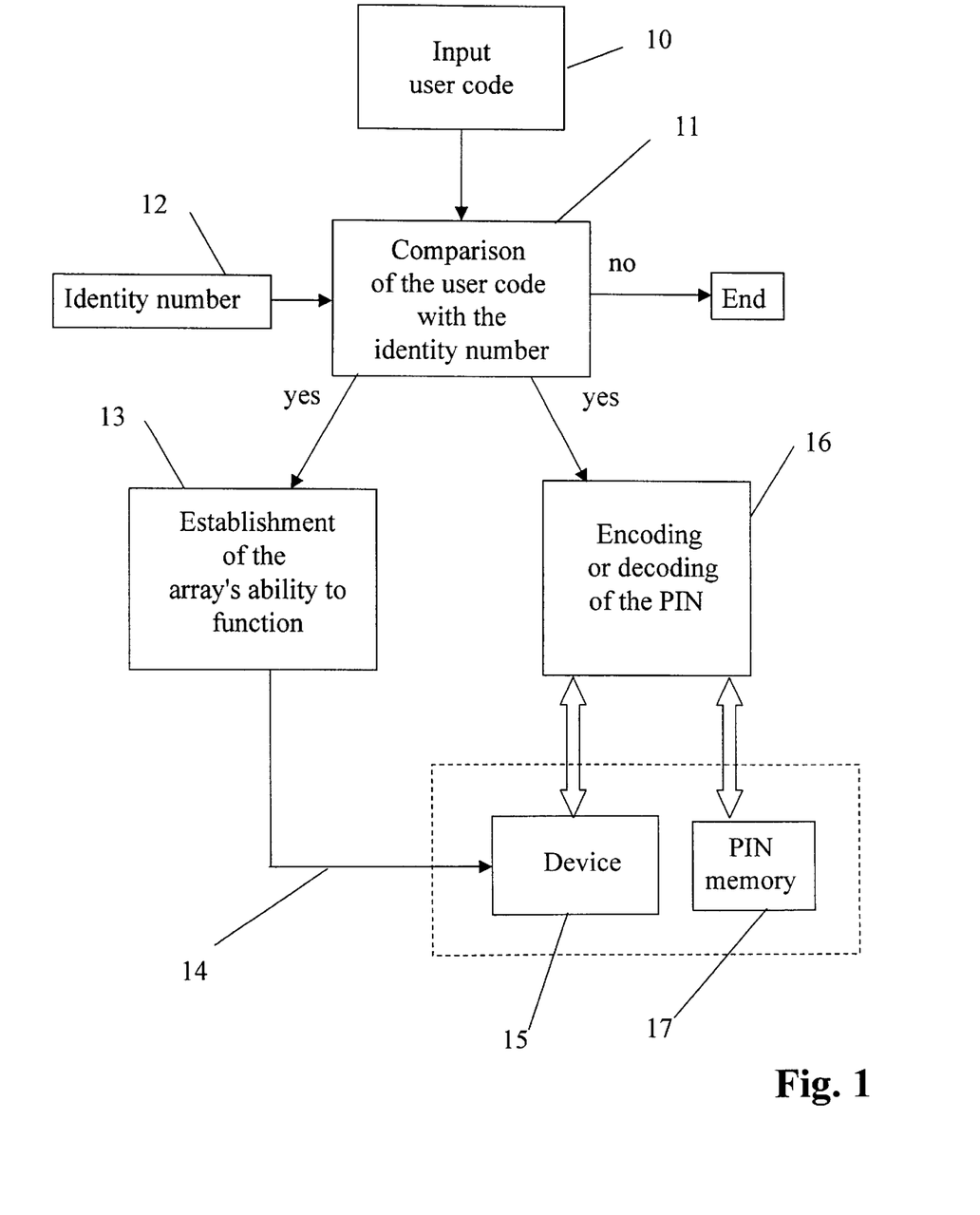
FIG. 1 is a sequence according to the invention.

FIG. 1 shows the sequence for a device in the form of a mobile telephone 15 which is operated in an automobile. This automobile is protected against unauthorized use by a so-called driving-block. In this case the driving-block is designed so that the car key or the remote control includes a memory which contains the so-called user code. If the vehicle is to be driven and the key is therefore inserted into a lock in the vehicle or the remote control is used, the memory containing the user code is read first. In FIG. 1 this takes place in the box marked 10. The user code is then transmitted to a comparator 11. The unique identity number, which is also stored in memory 2, is also transmitted to the comparator 11. If as shown in the embodiment in FIG. 1 the user code is the same as the unique identity number stored in the memory 12, the comparator 11 only checks the conformation between the user code and the unique identity number read from the memory 12. If this conformation does not exist, use of the automobile is refused. The automobile function is provided if a conformation is determined. FIG. 1 illustrates this with the box marked 13. Simultaneously with the provision of the automobile function, the device in the form of the mobile telephone 15 is started via line 14.

If the above described event takes place for the first time, to establish its function the mobile telephone 15 requests the PIN, without the input of which no log-in to the operator's network can occur. If the user knows the PIN and wants to ensure that he does not need to enter a PIN when he starts the vehicle in the future, after a first input the PIN is encoded by means of the unique identity number in the encoding/decoding array 16, and stored in the PEN memory 17.

If the vehicle is again to be used after the above described input procedure, and the key or the remote control is used to that end, the steps discussed above take place accordingly. If the power to the mobile telephone 15 is also supplied via line 14, the mobile telephone 15 requests the PIN. Since the comparator 11 has determined an authorized use of the automobile, the PIN memory 17 is read when the automobile function is provided (box 13), the encoded PIN is decoded in the encoding-/decoding array 16 by means of thee unique identity number, and is then made available to the mobile telephone 15 so that the network log-in can be established.

If after the last operation of the automobile the mobile telephone or even only the SIM card of the mobile telephone has been changed, when the automobile is operated again the PIN which applied to the old mobile telephone 15 or to the old SIM card, is made available after it is decoded by means of the unique identity number in the encoding/decoding array 16. However since the old PIN does not authorize the use of the new mobile telephone 15 or the new SIM card, the user is asked to enter a valid PIN, i.e. one that is required to operate the new mobile telephone 15 or the new SIM card. If this new PIN is entered, it is encoded by means of the unique identity number in the array 16 and stored in the PIN memory 17. This storage of the encoded PIN can be arranged so that the old PIN is either overwritten or the new PIN is additionally stored. In the latter case and for each operation of the vehicle, all the stored (encoded) PINs are sequentially decoded by the array 16 and made available to the then existing mobile telephone 15. To abbreviate this process, the PIN which was entered last into the PIN memory 17 is read and decoded first.

Even if it must be considered a coincidence if the SIM card or the mobile telephone 15 is changed and the new SIM card or the new mobile telephone 15 has the same PIN, it cannot be entirely excluded either. This can lead to the new mobile telephone 15 being used, although this was not at all intended. The successive provision of PINs stored once in the PIN memory 17 can also lead to problems if the capacity of erroneous PIN inputs is exceeded when different PINs are provided for the SIM card which is specified for the network log-in.

But since the SIM cards themselves have an identification number, the following can be used to change the process when several PINs are stored in the PIN memory 17: if the user has entered the valid PIN for this mobile telephone 15 during its first operation, the SIM card's identification number is also stored in the PIN memory 17 in addition to the encoded PIN. Is the SIM card subsequently exchanged and the vehicle is being operated, a corresponding input into the PIN memory 17 is first sought by means of the new SIM card's identification number. If no corresponding input is determined, the user is requested to enter a PIN. However if the new SIM card had already been used once in the vehicle before its exchange, by storing a PIN (in the encoded form) under this SIM card's identification number, an immediate network log-in takes place even if the SIM card is exchanged.

If the mobile telephone 15 is not permanently attached to the automobile but can also be used outside, it should be ensured that when the mobile telephone 15 is removed from the automobile, an existing network log-in is interrupted immediately or after a defined time, resulting in the user having to log in again if this situation occurs. This ensures for example that mobile telephones 15 which are authorized in an automobile and are therefore logged-in, maintain their network log-in for a long time after their removal due to the continuous recharging by the internal battery. To make this additional safety comfortable for the authorized user, the network log-out due to the removal should only take place when a current telephone call has ended. Should the network log-out of the mobile telephone 15 only take place after a defined period of time, the user should be informed of this condition by an acoustic signal and be requested to enter the PIN. As to how this network log-out is finally configured is left to the expert. Removal of the mobile telephone 15 from the vehicle should also lead to the complete erasure of the respective PIN memory 17.

Even if according to the embodiment in FIG. 1 the PIN memory 17 is located in the vehicle itself, the broken line around the mobile telephone 15 and PIN memory 17 indicates that in another—not illustrated—embodiment the PIN memory 17 can also be located in the mobile telephone 15 or in the device.

For reasons of completeness it should be pointed out that with the embodiment explained in connection with FIG. 1, a number which is derived from the full identity number can be used instead for the encoding and decoding, for example by using only the first two and/or the last two digits, or a hash code of the unique identity number.

Figure 2:
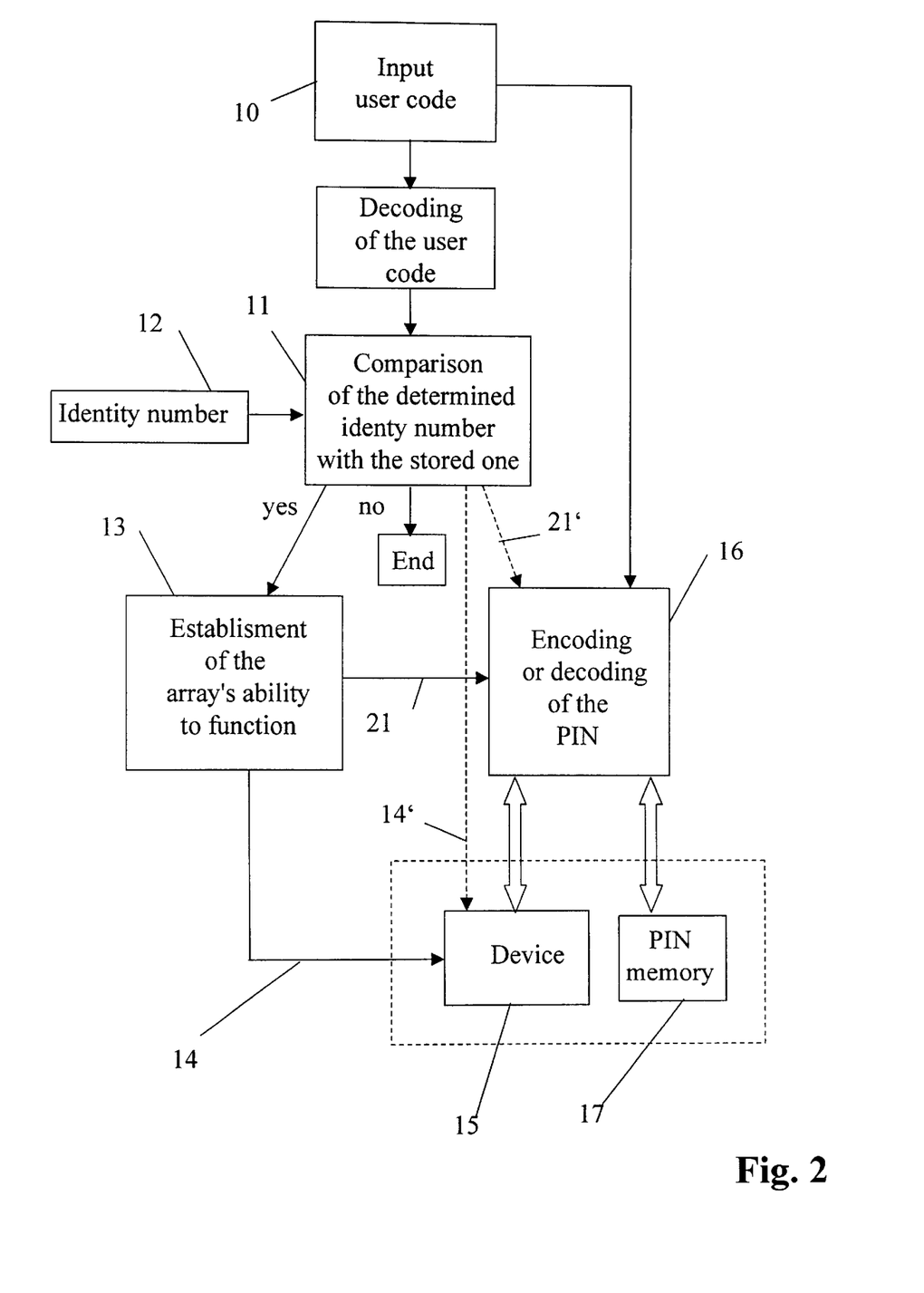
FIG. 2 is another sequence according to the invention.

The embodiment according to FIG. 1 differs from the one in FIG. 2 in that here a true user code, i.e. one that differs from the unique identity number, is stored in the key or in the automobile's remote control. If this true user code is read (box 10) when the key or the remote control is activated, it must first be decoded. This takes place in the decoder 18, in that for example a sequence of digits is determined from the user code by means of a stored data word, which is subsequently compared in the comparator 11 with the unique identity number stored in the memory 12. If a conformation is determined, the automobile's ability to function is established—as shown in box 13—and the mobile telephone 15 is connected via line 14 to the automobile's power source. In addition, with a positive comparison between the determined sequence of digits and the unique identity number, the encoding/decoding array 16 is switched on so that it can receive the user code which becomes available via line 20. It is immaterial whether the array 16 is switched on via control line 21 or directly via control line 21 (shown by a broken line in FIG. 2), if turning on the array 16 is only intended for supplying the power. But to ensure beforehand that certain user codes exclude the use of the mobile telephone 15, and to that end the comparator 11 is modified so that the degree of conformation of the respective user code with the identity number decides about the activation of the array 16, the latter should take place exclusively via control line 21 once the automobile's ability to function is established. (box 13). If desired, in that case the supply of power to the mobile telephone 15 can also take place separately from the establishment of the automobile's ability to function (box 13), by replacing line 14 which fulfills this purpose with line 14 (shown by a broken line in FIG. 2).

If the PIN memory 17 is still empty when the automobile is first operated, as already explained in connection with FIG. 1 either none or an erroneous PIN is transmitted to the mobile telephone 15 which is ready to operate and waits for a PIN. The user then has the possibility of activating an automatic PIN input by once manually entering the PIN required to use the mobile telephone 15. This manually entered PIN is then encoded by means of the user code and stored in the PIN memory 17, so that when the same user code is entered during a subsequent operation of the automobile, the PIN stored in the PIN memory 17 is decoded and transmitted to the mobile telephone 15 to establish the operating condition. However if another user code which also permits operating the automobile is used during a later automobile operation, the array 16 determines an erroneous PIN which is made available to the mobile telephone 15. To be able to use the mobile telephone anyway, the user who was refused the use of the mobile telephone 15 because of the unauthorized code, must know the PIN and enter it manually. This function is particularly advantageous with rented or business cars, because then the vehicle key alone decides about the use of the mobile telephone, without any special measures.

Problems can however arise when the latter procedure is used, if the user code authorizes the use of a mobile telephone 15 and a PIN stored in the memory 17 is issued for that purpose, but the user employs another SIM card or another mobile telephone 15 and repeatedly starts the automobile. The repeated starting of the automobile and the respective issuance of the PIN can very easily exceed the number of erroneous PIN inputs, which finally causes a blockage. But as already explained earlier, if the identity numbers of the SIM cards are also stored in the PIN memory 17, the SIM card's identity number can also be used in that case so as not to change the possible number of erroneous PIN inputs. This can take place for example in that no PIN is issued if the identity number of the SIM card being used has not yet been stored in the PIN memory 17.

For reasons of completeness it should be pointed out that even if the user code is entered, it is not entirely used for encoding or decoding. Rather it is also sufficient if for example only the first three digits of the respective user code are entered.

Figure 3:
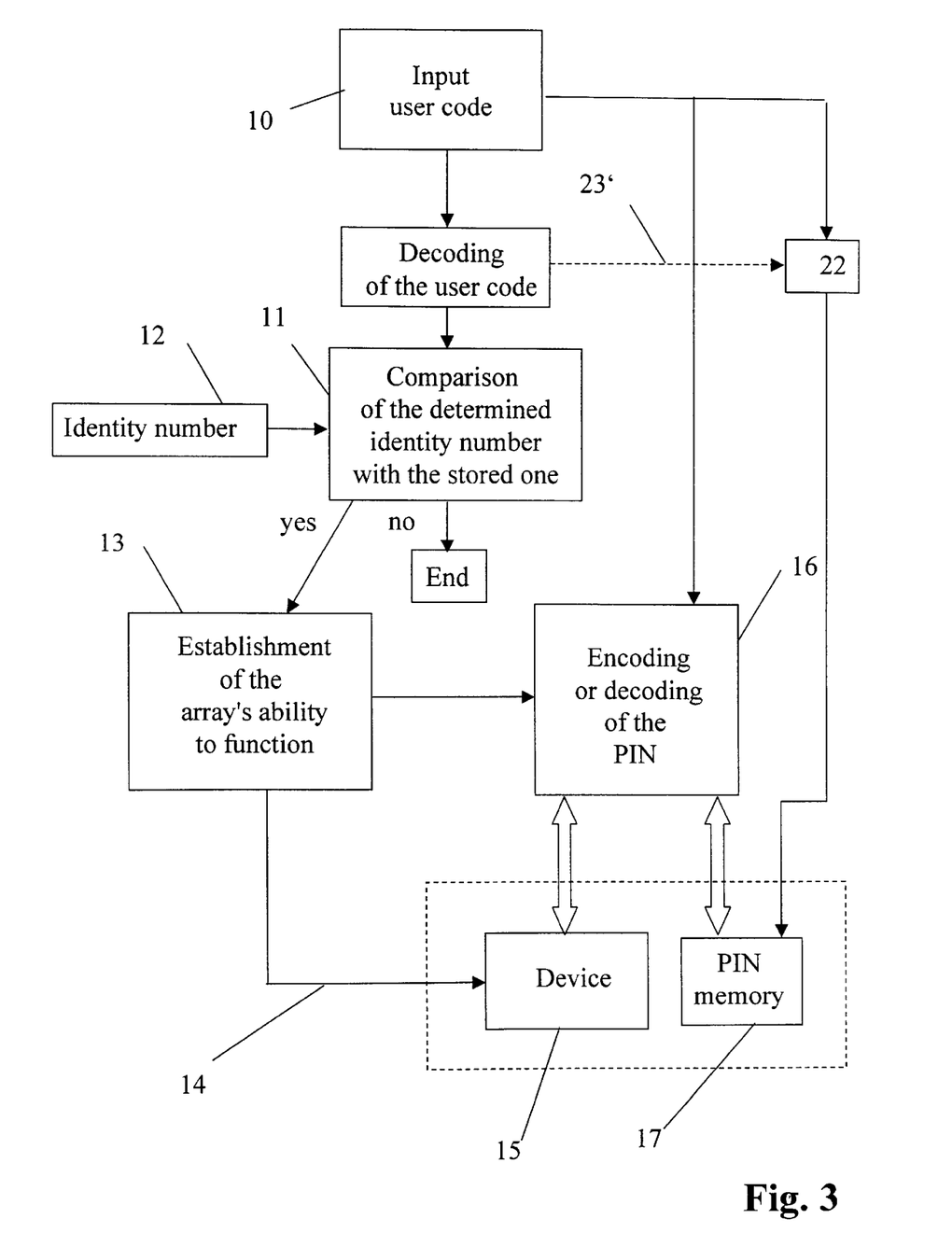
FIG. 3 is a further sequence according to the invention.

Most of the embodiment in FIG. 3 is structured in accordance with the embodiment in FIG. 2. In contrast to the embodiment in to FIG. 2, different mobile telephones 15 can be operated in the automobile, where the respective PIN of the mobile telephone 15 being used in the automobile is immediately logged into the operator's network as a function of the entered user code, without the need to enter the PIN. To that end the PIN memory 17 is designed as an addressable memory.

If the automobile is started for the first time with a user code, the steps which were already explained in greater detail in connection with FIG. 2 take place. In addition the station 22 builds an address information from the user code. This takes place for example in that a unique address information is built from the last three digits of the user code. This address information is then provided to the PIN memory 17 where it leads to a readout of the corresponding storage place. Since the PINs in the embodiment according to FIG. 3, which are stored in encoded form in different places of the PIN memory 17, are also encoded by means of the respective user code, no PIN is automatically transmitted to the mobile telephone 15 during a first use of the automobile, because of the still empty storage place after the latter is read out and then processed in the array 16. The log-in to the network then takes place after the automobile's user manually enters a correct PIN. Simultaneously the PIN is encoded in the array by means of the user code and stored in the place assigned to this user code in the PIN memory 17. In the same way the just mentioned mobile telephone 15, another mobile telephone 15 or even no mobile telephone may be assigned to other keys or remote controls of the automobile, all of which have a different user codes. For example if the user code A is assigned to mobile telephone A, user code B to mobile telephone B and user code C to no mobile telephone, and the automobile is later started with the user code B, the respective address of the user code is first determined in station 22 and this storage place is then read out and made available to the array 16. The read out PIN is then decoded by means of the user code and provided to the mobile telephone 15. If at that time the mobile telephone A or its SIM card are present in the automobile, an erroneous PIN is transmitted to this mobile telephone 15 which simultaneously prevents the network log-in if the user has not manually entered the valid PIN for this mobile telephone. Whether this manual input overwrites the storage place assigned to the user code B, which is already occupied by the encoded PIN for mobile telephone B, or only permits a temporary use of the mobile telephone A, may be dependent on a general convention or on an additional confirmation of the overwrite function.

By contrast, if the mobile telephone B in the above example or its SIM card is present in the automobile, the correct PIN is immediately transmitted to the mobile telephone 15 and the network log-in takes place. The same applies if the automobile, which is equipped with the mobile telephone A, is started with the user code A.

If it must be ensured that a user code in general prevents the ability of mobile telephones to function, this can easily be realized in that this user code, after it passes through the station 22, issues an address information which has no assigned storage place in the PIN memory 17. The broken line 23 indicates that the respective address information can also be built from the decoded user code.

Figure 4:
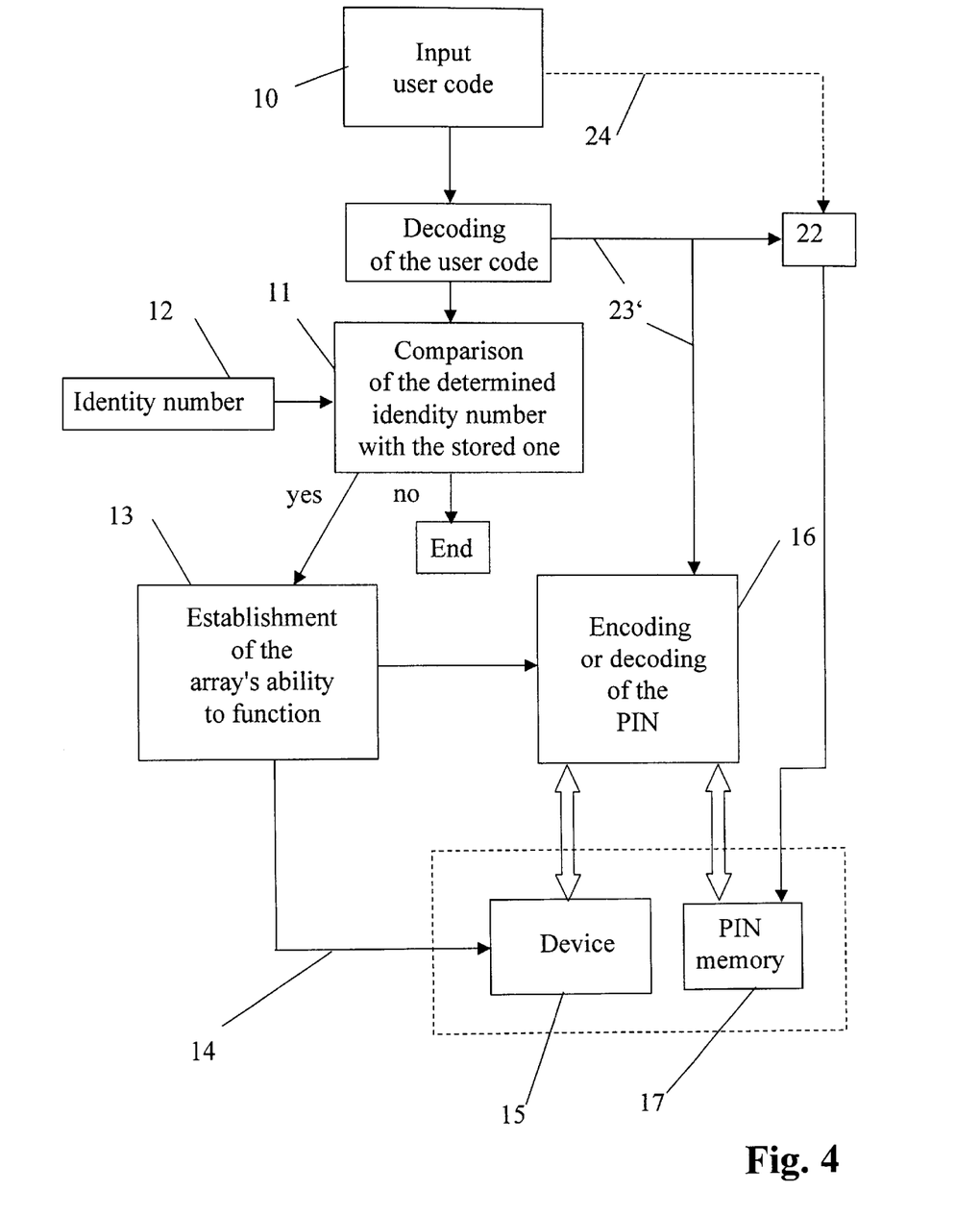
FIG. 4 is still another sequence according to the invention.

In contrast to FIG. 3, the embodiment according to FIG. 4 applies the decoded user code to encode and decode the PIN. In addition the decoded user code is provided to station 22, which leads to the production of the address information assigned to the respective decoded user code-storage place in PIN memory 17. As indicated by line 24, the unencoded user code can also be used instead of the decoded user code to produce the address information.

In connection with the embodiment shown in FIG. 4, it makes no difference whether the completely decoded user code or only a portion of it is used for encoding or decoding. However special advantages result if the user codes for the authorized use of an automobile are organized so that after the decoding each identity number, which is determined from this user code and is provided to the comparator 11, has the same sequence of digits for all the user codes. If the same sequence of digits is used for encoding or decoding all the user codes in the array 16, an existing mobile telephone 15 can always be used to receive calls, even if the storage place in PIN memory 17 which is called up by the user code has no encoded PIN. This can be achieved in that, if no valid PIN is transmitted to the mobile telephone 15 after a period of time, another storage place is automatically read out in the PIN memory 17. If this readout of the other storage place leads to a valid PIN, the mobile telephone 15 is logged into the network by means of this PIN with the limitation that calls can only be received. It can also be imagined that in addition to only receiving calls, a limited number of call numbers and/or a predetermined number of calls or call units can also be released. Furthermore, if the decoded user code of station 22 is used to produce the address information, the respective user code which is made available in station 22 to produce the respective address information, can be designed so that it differs from the sequence of digits used for all user codes determined after the decoding, and which are used for encoding and decoding in the array 16. But since the encoded user codes (box 10) are always different, they should be used to fully or partly reduce the effort required to produce the address information via line 24.

Even though all the embodiments illustrate one unit composed of a mobile telephone 15 and the PIN memory 17, this unit can also comprise the array 16 and/or the station 11 as desired by the expert.

It should also be mentioned in addition that the environment in which the mobile telephone 15 operates can also be a building. For example if the mobile telephone is left overnight in or outside of a charging station in the office and the office is closed, the mobile telephone 15 is switched off by means of a signal. This achieves a log-out of the mobile telephone from the network, which eliminates the greatest theft enticement. For example when the office is opened the next morning with an authorized key, the mobile telephone 15 is started again and the user identifies himself with a code so that he can log into the network. By contrast if another person opens the office door in the meantime, the user code stored in that key only leads to the network log-in if this user code is also able to decode the PIN stored in the mobile telephone 15 or in the charging station.

What is claimed is:

1. A method of starting, a device which is protected against unauthorized use by a PIN without using an input from a user, where the device operates in an environment which allows the use of this environment by comparing a user code with a unique identity number stored in the environment wherein:

the PIN, which is needed to use the protected device, is encoded by means of the unique identity number and is stored in a memory, a comparison between the user code and the unique identity number allows the use of the environment, and the encoded and stored PIN is decoded by means of the unique identity number and is made available to the protected device to establish its operating status.

2. A method as claimed in claim 1, characterized in that the unique identity number used for encoding or decoding the PIN is a number which is derived from the unique identity number.

3. A method as claimed in claim 1, characterized in that the protected device is a telephone, and that the environment in which the protected device operates is a vehicle or a building.

4. A method as claimed in claim 1, characterized in that a number of different user codes is provided, where after a "comparison", all of them allow an authorized use of the array and that either the "degree of conformation" of the respective user code with the unique identity number, or the respective user code itself decides whether the decoding of the stored PIN and/or its use is allowed.

5. A method as claimed in claim 4, characterized in that the protected device is a telephone, and that the environment in which the protected device operates is a vehicle or a building.

6. A method of starting a device protected against unauthorized use by a PIN without using an input where the device operates in an environment which in turn allows the use of an array by comparing a user code with a unique identity number stored in the array, characterized in that in a first step the PIN, which is needed to use the protected device, is encoded by means of at least a portion of the user code and is then stored in a memory, and that with a "comparison" between the user code and the unique identity number, which allows the use of the array, the encoded PIN is decoded by means of the user code and made available to the protected device to establish its operating status.

7. A method as claimed in claim 6, characterized in that a number of different user codes is provided, where after a "comparison" all of them allow an authorized use of the array and that either the "degree of conformation" of the respective user code with the unique identity number, or the respective user code itself decides whether the decoding of the stored PIN and/or its use is allowed.

8. A method as claimed in claim 4, characterized in that the protected device is a telephone and that the environment in which the protected device operates is a vehicle or a building.

9. A method as claimed in claim 6, characterized in that the protected device is a telephone, and that the environment in which the protected device operates is a vehicle or a building.

* * * * *

UNITED STATES PATENT AND TRADEMARK OFFICE
CERTIFICATE OF CORRECTION

PATENT NO. : 6,696,919 B1 Page 1 of 1
DATED : February 24, 2003
INVENTOR(S) : Leickel et al.

It is certified that error appears in the above-identified patent and that said Letters Patent is hereby corrected as shown below:

Column 8,
Line 36, please delete "," after "starting".

Column 10,
Line 5, please cancel "claim 4" and substitute -- claim 7 --.

Signed and Sealed this

Twenty-fifth Day of May, 2004

JON W. DUDAS
*Acting Director of the United States Patent and Trademark Office*